United States Patent [19]

Francis

[11] 4,065,722
[45] Dec. 27, 1977

[54] DEMODULATION METHOD AND CIRCUIT FOR DISCRETELY MODULATED AC SIGNALS

[75] Inventor: John R. Francis, Port Moody, Canada

[73] Assignee: Glenayre Electronics, Ltd., North Vancouver, Canada

[21] Appl. No.: 753,993

[22] Filed: Dec. 27, 1976

[51] Int. Cl.$^2$ .................. H03D 1/00; H03D 3/00; H03D 5/00
[52] U.S. Cl. .................. 329/105; 325/320; 325/338; 325/349; 329/110; 329/126; 329/166
[58] Field of Search .................. 329/104–107, 329/109, 110, 126, 166; 325/320, 338, 344, 349

[56] References Cited

U.S. PATENT DOCUMENTS

| | | | |
|---|---|---|---|
| 3,764,926 | 10/1973 | Rypinski, Jr. | 329/104 |
| 3,899,741 | 8/1975 | Brandt et al. | 329/104 |

Primary Examiner—Siegfried H. Grimm
Attorney, Agent, or Firm—Christensen, O'Connor, Garrison & Havelka

[57] ABSTRACT

Demodulation of an ac signal that has been modulated by discrete changes in its amplitude, frequency or phase, is effected by first feeding the modulated ac signal through an amplitude limiter and hence through a bandpass filter tuned to a preselected frequency of the ac signal. The resulting bandpass-filtered ac signal defines a variable amplitude envelope which varies in response to amplitude, frequency or phase modulations of the input ac signal. Amplitude variations of the envelope of the bandpass-filtered ac signal are detected by a switching circuit whose operation has been termed "self-synchronous," because it is synchronized to the frequency of the ac signal prior to the passage of the ac signal through the bandpass filter. More particularly, the switching circuit is opened and closed in response to the ac signal appearing at the input to the bandpass filter, to cause alternate, like-polarity half cycles of the bandpass-filtered ac signal to be selectively conducted to a low-pass filter. Filtering by the low-pass filter extracts modulation information from the detected envelope thereby completing the demodulation process. By virtue of the "self-synchronous" detection, the demodulation process is less prone to false detection of modulation information when noise or other spurious signals accompany the modulated ac signal, and is faster in responding to information-bearing changes in the modulated ac signal.

18 Claims, 12 Drawing Figures

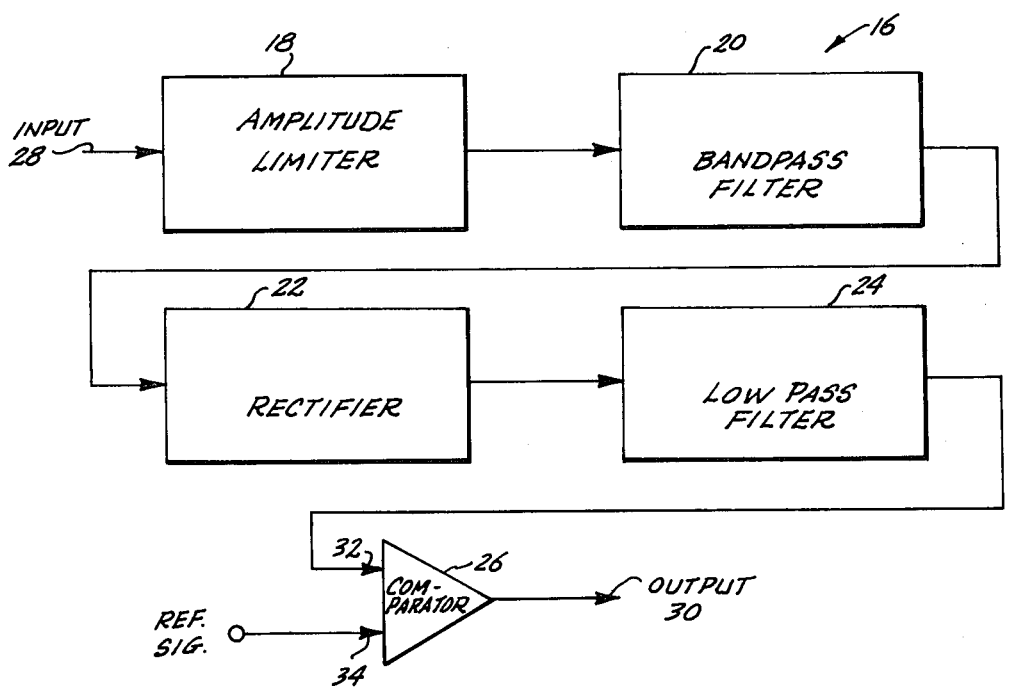
Fig. 1. PRIOR ART
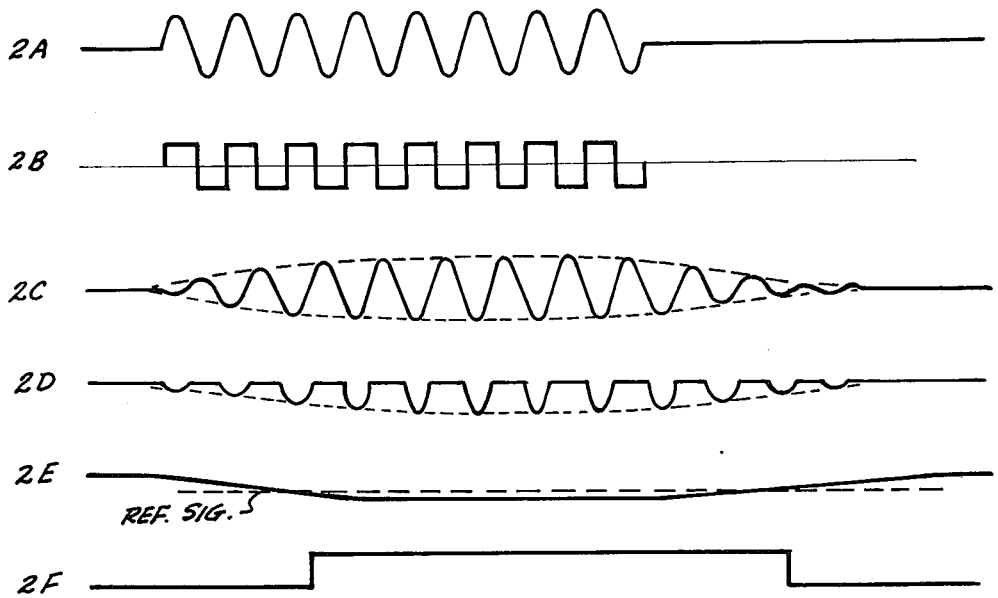
Fig. 2. PRIOR ART (ASK)

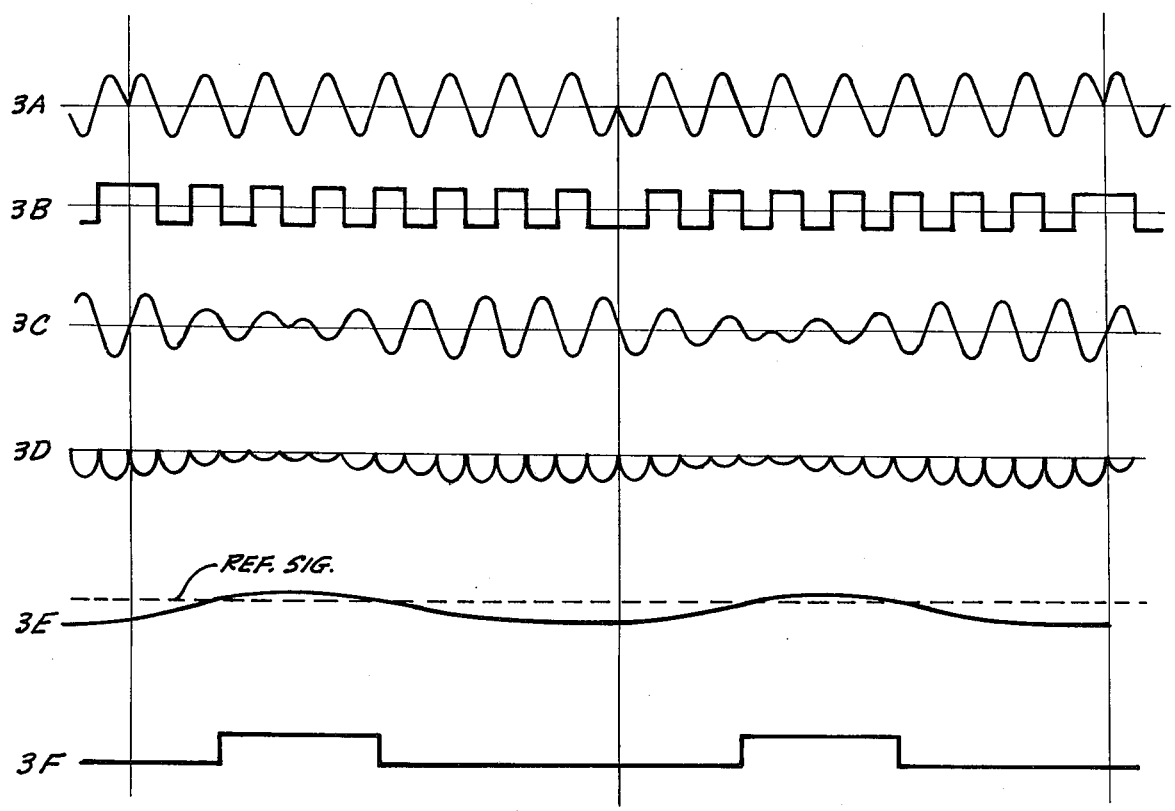
Fig. 3. PRIOR ART (PSK)
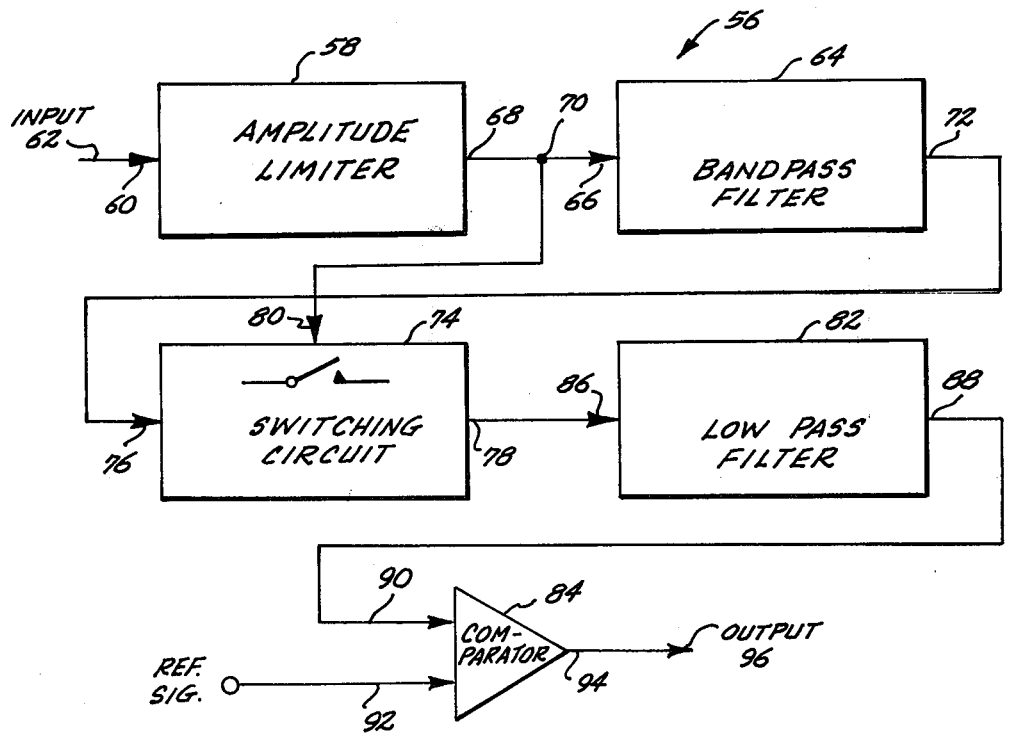
Fig. 4.

Fig. 12.
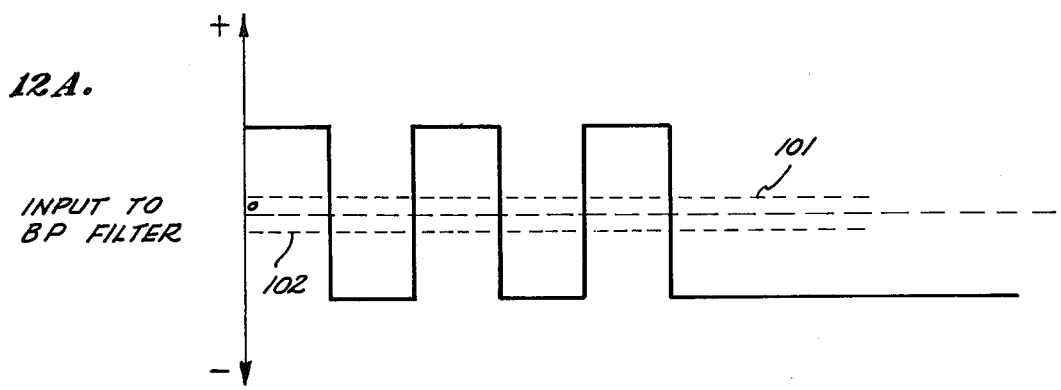
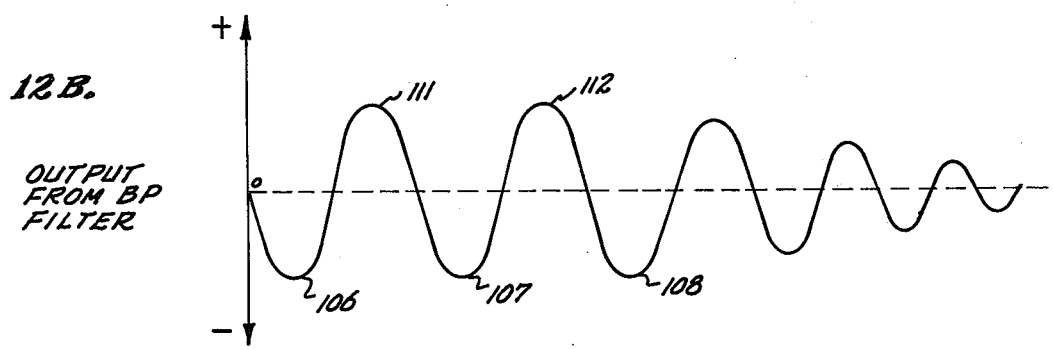
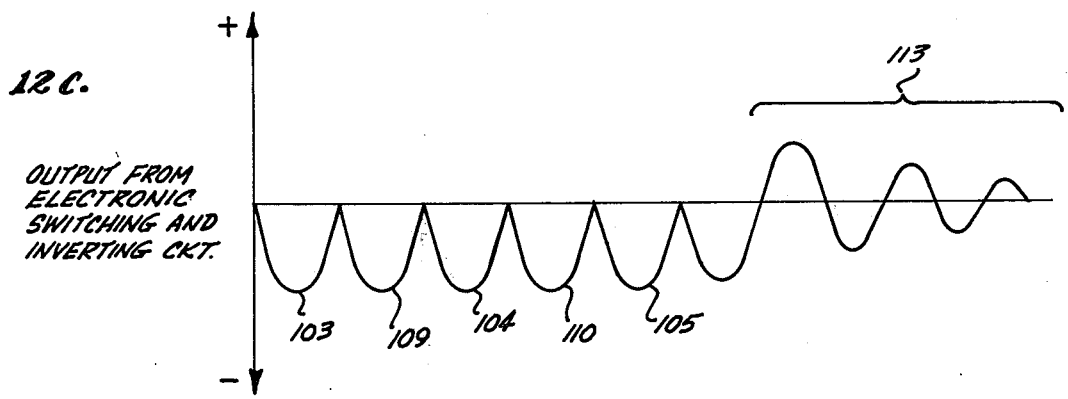

DEMODULATION METHOD AND CIRCUIT FOR DISCRETELY MODULATED AC SIGNALS

BACKGROUND OF THE INVENTION

The invention relates to the demodulation of ac signals that have been modulated by discrete changes in amplitude, frequency or phase. As an example, the discretely varying amplitude, frequency, or phase modulations of the ac signal may represent binary-coded signal information.

More particularly, the invention pertains to demodulators and to demodulation methods for extracting discretely varying modulation information from modulated ac signals generated by one or more of the following systems: Amplitude Shift Keying (based on amplitude modulation and sometimes referred to as ASK); Frequency Shift Keying (based on frequency modulation and sometimes called FSK): Phase Shift Keying (based on phase modulation and sometimes called PSK); Dual-Tone Multi-Frequency Telephone Signalling (a special form of ASK and sometimes called TOUCH-TONE, a trademark of American Telephone and Telegraph Company); Tone-Coded Squelch Signalling (which again is actually a form of ASK); Differential Phase Shift Keying (a special form of PSK); and in general any systems akin to one or more of these specifically named systems.

In all of the foregoing systems, the ac signal is discretely modulated by abrupt shifts in amplitude, frequency or phase. This type of modulation is to be contrasted with continuously varying modulation commonly used in the radio transmission and reception of voice and music signals, (e.g., AM and FM radio). Discretely modulated ac signals are especially useful in the transmission and reception of the type of signal information which varies in a discrete fashion, such as binary-coded signals and on/off control signals.

For example, in transmitting binary-coded signals using ASK, an ac signal of constant frequency (sometimes called a "tone" because it is often at a frequency within the audible spectrum) is modulated between zero and a predetermined non-zero amplitude and thus alternately appears as the presence of tone (non-zero amplitude) and the absence of tone (zero amplitude). In one form of ASK, the presence of tone is assigned one binary value, while the absence of tone is assigned the other binary value. The tone is thus alternately keyed on and off to form the modulated ac signal that bears the binary-coded information. The binary-coded information is transmitted in the form of a modulated ac signal in order to simplify and enhance the reliability of the transmission process, primarily because of the relative ease with which an ac signal can be transmitted and received.

While there are a variety of demodulating circuits for recovering the modulation information from discretely modulated ac signals, one type of circuit is widely used because of its relatively low cost, and because of its ability to demodulate all three types of discretely modulated signals, namely, amplitude, frequency and phase. This preferred circuit includes an amplitude limiter, a bandpass filter, a rectifier detector, a low-pass filter and a comparator, which are serially connected in the mentioned order between an input and an output of the demodulator. The modulated ac signal is received at the input and is fed through the amplitude limiter to eliminate spurious variations of the amplitude of the modulated signal, e.g., fading of a radio transmission, whereafter the modulated signal is applied to an input of a bandpass filter having a bandpass centered about a preselected frequency of the modulated ac signal. A bandpass-filtered ac signal is produced at the filter's output which varies in amplitude in response to amplitude, frequency and phase modulations of the modulated ac signal applied to the filter's input. Depending on the type of modulation, i.e., amplitude, frequency or phase, the rectifier detector, low-pass filter and comparator function is related but slightly different ways (described more fully herein) to recover the modulation information which is presented at the circuit's output in the form of a signal that shifts from one discrete voltage or current level to another each time there is a shift in modulation.

While the above-described type of demodulator has proven useful for most applications, it does have certain operational limitations. These limitations fall in two categories: first, less than ideal response speed; and second, susceptibility to faulty operation when noise and other spurious signals accompany the modulated ac signal. While the characteristics of this type of demodulator that contribute to its operational limitations are described more fully herein, they may be briefly summarized here.

One factor which unduly limits the quickness of response is the combined time constants of the bandpass filter and low pass filter. For a bandpass filter of moderate or high selectivity (high "Q") a finite time must elapse before the signal from the output of such filter changes in response to a signal applied at its input and a still greater time must elapse before the signal changes at the output of the low-pass filter. This has the effect of increasing the overall response time of the demodulator. Furthermore, as the selectivity of the bandpass filter is increased (higher "Q"), there is an accompanying increase in the time constant of the bandpass filter, and together with the low-pass filter there is accordingly a further increase in the overall response time of demodulator. The increase in the response time of the demodulator has the effect of decreasing the maximum rate at which data can be transmitted via the modulated ac signal.

The susceptibility to faulty operation when noise and other spurious signals are present is also due to a characteristic of the bandpass filter. Both wide-band noise and spurious signals at subharmonic frequencies of the center frequency of the bandpass filter (the frequency to which it is tuned) cause the bandpass filter to "ring". "Ringing" is the result of the natural response of most bandpass filters when stimulated by input signals that have frequency components that equal, lie close to or are subharmonics of the center frequency of the filter. In such case, the output of the bandpass filter will produce a signal that has the appearance of a filtered ac signal having a frequency equal to that of the center frequency of the filter, and thus is sometimes indistinguishable from the presence of an information-bearing modulated ac signal. The result is false detection of an information signal when in fact no information signal is present.

Accordingly, it is an object of the present invention to provide an improved demodulation method and circuit of the type intended for recovering modulation information from discretely modulated ac signals. In particular, it is an object to improve the operational characteristics of the type of demodulation circuit described above, popular because of its simplicity and relatively low cost, by increasing its response speed and decreasing its susceptibility of faulty operation when noise and other spurious signals accompany the modulated ac signal.

SUMMARY OF THE INVENTION

The present invention is based upon the discovery that the performance of a demodulator circuit of the above-described type can be significantly enhanced by using a switching circuit controlled by the modulated ac signal at the input to the bandpass filter to perform the envelope detection which is usually performed by a rectifier circuit. The improved demodulator circuit is particularly adapted for recovering modulation information from an ac signal that has been modulated by discrete changes in amplitude, frequency, or phase.

The modulated ac signal, which has a predetermined frequency, is applied to an input of a bandpass filter, which is tuned to pass signal components having frequencies centered about the predetermined frequency of the modulated ac signal. The switching circuit that performs the envelope detection has a control input, a signal input and a signal output, and is connected with its signal input and signal output in series between an output of the bandpass filter and an input to a low-pass filter for selectively conducting signals from the former to the latter. The control input is connected to the input of the bandpass filter to cause the switching circuit to switch between first and second states in response to any signal, including the modulated ac signal, that appears at the input of the bandpass filter and alternates between positive and negative polarities. In its first state, the switching circuit conducts the signal from the output of the bandpass filter to the input of the low-pass filter. In its second state, the switching circuit provides in one embodiment an open circuit between the output of the bandpass filter and the input to the low-pass filter, to block the conduction of signals to the low-pass filter, and in another embodiment, for first inverting the polarity of the signal at the output of the bandpass filter, and then conducting the inverted polarity signal to the input of the low-pass filter.

In both embodiments the presence of the modulated ac signal (when it is at its non-zero amplitude) causes the switching circuit to be alternately switched between its first and second states at the predetermined frequency of the modulated ac signal and with a selected phase angle $\theta$ relative to the phase of the ac signal components that are passed to the output of the bandpass filter, so as to effect a rectification-like detection of such bandpass-filtered signal components and apply the resulting signal to the input of the low-pass filter. On the other hand, when the ac signal of the predetermined frequency is not present at the input of the bandpass filter, either due to the temporary removal or zero amplitude of the modulated ac signal, the switching circuit does not receive the predetermined-frequency, alternating-polarity signal at its control input and thus is not effective to rectify spurious signal components that might be produced at the output of the bandpass filter.

In effect, it can be said that the detection function of the switching circuit is correlated to the ac signal applied to the input of the bandpass filter to provide a "self-synchronous" detection which has been found to yield a number of unexpected operational advantages, including faster response to modulation shifts and far less susceptibility to false operation when noise or other spurious signals accompany the modulated ac signal.

For most applications, the phase angle $\theta$ between the ac signal applied to control input of the switching circuit and the ac signal components passed to the output of the bandpass filter, is selected according to the relationship: $\theta = n\pi$, where $n = 0, 1, 2, 3, 4, \ldots$ In one embodiment, a bandpass filter is used that has a 180° phase shift between its input and output for ac signals at the predetermined center frequency of the bandpass, so that the input and output signals of the bandpass filter can be applied directly to the control input and signal input, respectively, of the switching circuit to satisfy the phase angle requirement with $\theta = 1\pi$ (or 180°).

As indicated above, the switching circuit may provide open and closed conditions when in its first and second states, respectively, in which case the switching circuit functions to provide detection similar to that provided by a half-wave rectifier. However, the preferred form of the demodulator employs a switching circuit which in its first state conducts signals from the output of the bandpass filter to the low-pass filter as in the above embodiment, but which in its second state provides for inverting the polarity of the signals at the output of the bandpass filter and then conducting the inverted polarity signals to the low pass filter. In this latter embodiment, the switching circuit performs a detection that is similar to detection by means of full-wave rectification.

For most applications, the improved demodulator circuit preferably includes an amplitude limiter circuit connected in a known manner, ahead of the bandpass filter, for limiting the modulated ac signal to a predetermined maximum amplitude level. Variations in the amplitude of the ac signal due to fading and other transmission disturbances are thus eliminated. In such case, the control input of the switching circuit is coupled to the junction between an output of the amplitude limiter circuit and the input of the bandpass filter.

Also, for most uses the demodulator circuit will preferably include a comparator circuit having a first input connected to an output of the low-pass filter and a second input connected to receive a reference signal. An output of the comparator switches between discrete signal levels, depending upon whether the magnitude of the signal at the output of the low-pass filter is above or below that of the reference signal. The threshold at which the output of the comparator switches is selected by adjusting the magnitude of the reference signal for optimum recovery of the modulation information, and such an adjustment depends upon whether the modulated ac signal has been amplitude modulated, frequency modulated, or phase modulated.

A demodulator circuit incorporating the above principles has been found to provide a significant improvement in the reliability and response speed of the above-characterized type of demodulator. In particular, the increase in response speed enables the information that is represented by modulations of the ac signal to be transmitted at a faster rate. Additionally, the demodulator is better able to discriminate between a true information signal and the presence of noise and other spurious signals at the input to the bandpass filter. In the presence of noise or other spurious signals, the switching circuit is not operated at the required frequency and phase for detection of signal components at the output of the bandpass filter, and thus the demodultor is less likely to produce false responses at its output.

To provide a complete disclosure of the invention and its advantages, reference is made to the appended drawings and following description of certain particular and preferred embodiments.

BRIEF DESCRIPTION OF THE DRAWINGS

FIG. 1 is a simplified block diagram of one well-known and widely used demodulator circuit for recovering modulation information from modulated ac signals of the type that have been discretely modulated by amplitude, frequency, or phase.

FIG. 2 is a set of graphs, 2A – 2F, illustrating a family of waveforms that depicts the operation of the prior art demodulator shown in FIG. 1 when used for demodulating ASK signals.

FIG. 3 is another set of graphs, 3A – 3F, illustrating a family of waveforms that depicts the operation of the prior art demodulator circuit of FIG. 1 when used for demodulating PSK signals.

FIG. 4 is a simplified block diagram of the improved demodulator circuit in accordance with the embodiment of the invention.

FIG. 12 is a set of graphs, 12A – 12C, illustrating the operation of the demodulator circuit shown in FIG. 11 at the end of a "tone".

DETAILED DESCRIPTION

Description of the Prior Art

Figure 5:
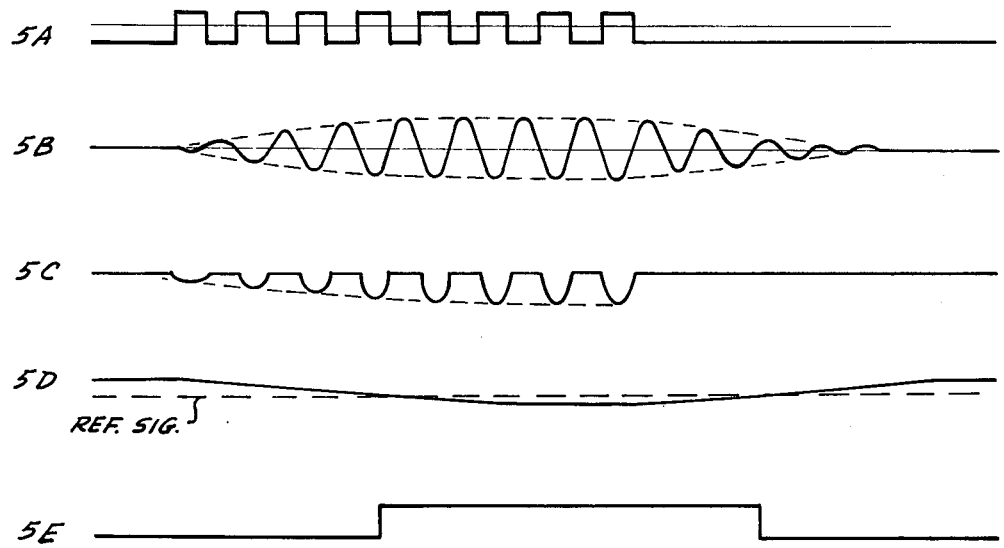
FIG. 5 is a set of graphs, 5A – 5F, illustrating a family of waveforms that depicts the operation of the demodulator circuit of the present invention as it is shown in FIG. 4 when used for demodulating ASK signals.

In order to best appreciate the construction, operation, and advantages of the demodulator of the present invention, it is helpful to first describe one widely used prior art demodulator circuit, which has been referred to briefly in the above section on the background of the invention, and is shown in FIG. 1. As depicted therein, prior art demodulator circuit 16 includes an amplitude limiter 18, a bandpass filter 20, a rectifier 22, a low-pass filter 24, and a comparator 26, all serially connected in the mentioned order for receiving the signal that is to be demodulated at an input 28. Amplitude limiter 18 receives the modulated ac signal and limits its amplitude to a predetermined maximum level, and applies the resulting amplitude-limited modulated ac signal to bandpass filter 20.

Bandpass filter 20 has a relatively narrow bandpass centered at the predetermined frequency of the ac signal to be demodulated. In general, bandpass filter 20 rejects other signals that may be present at input 28, such as other modulated ac signals of other predetermined frequencies, and passes only the components of the ac signal that have the predetermined frequency.

Rectifier 22 and low-pass filter 24 together function in a well-known manner to detect variations in the envelope defined by the peak amplitudes of the signal components passed to the output of filter 20. Rectifier 22 may be provided by a half-wave rectifier circuit or a full-wave rectifier circuit, and low-pass filter 24 may be provided by any of a number of well-known filter circuits that reject signal fluctuations at and above the predetermined frequency of the modulated ac signal and pass signal components that vary at lesser frequencies, namely at frequencies of the modulation information which is to be recovered from the modulated ac signal.

Comparator 26 is a circuit that responds to signals applied to its inputs 32 and 34 and switches between two discrete voltage or current levels at output 30, depending upon the relative magnitudes of signals at inputs 32 and 34. Input 32 is connected to receive the filtered signal passed to the output of filter 24, and input 34 is connected to receive a reference signal. Output 30 of comparator 26 assumes a first discrete level if the signal from filter 24 (input 32) exceeds the magnitude of the reference signal (input 34), and assumes a second discrete level if the signal from filter 24 (input 32) falls below the magnitude of the reference signal (input 34). The magnitude of the reference signal at input 34 is adjusted so that output 30 of comparator 26 switches between its two discrete levels each time a change in the signal from filter 24 indicates that there has been a discrete shift in the modulation of the modulated ac signal received at input 28.

The operation of demodulator circuit 16 when used in an ASK system is illustrated by FIG. 2. The waveform in Graph 2A shows a sinusoidal ac signal having an initial interval of zero amplitude, followed by an ac signal of constant non-zero amplitude which as explained below may be called the "tone burst," and lastly another interval of zero amplitude. This entire signal, including the zero amplitude portions and the "tone burst," constitute the ASK modulated ac signal that is applied to input 28 of the demodulator circuit 16 of FIG. 1.

In an ASK system, these discrete signal conditions of non-zero amplitude and zero amplitude may be used to represent the two states of binary-encoded data, or they may be used to represent two states of a control signal. When there is a series of transistions between states, the modulations cause the ac signal to appear as a succession of "bursts" of ac cycles (Graph 2A), and since the ac signal is somtimes called a "tone," the "bursts" are sometimes referred to as "tone bursts," and the demodulation process is sometimes characterized as the detection of the presence of absence of "tone" or of "tone bursts."

The output of amplitude limiter 18 is shown by the waveform of Graph 2B. In this instance, amplitude limiter 18 is of the nonlinear clipping type that converts the sinusoidal "tone burst" shown in FIG. 2A into a square-wave signal.

Graph 2C shows the output signal from bandpass filter 20 as it responds to the application of the squared "tone burst" of Graph 2B. As depicted in Graph 2C, the output of bandpass filter 20 does not respond immediately to the beginning and end of the "tone burst," but rather builds up gradually in response to the abrupt appearance of the "tone burst" and decays gradually at the end of the "tone burst". Since the bandpass filter 20 is constructed so as to pass only a narrow range of signal frequencies, centered about the predetermined frequency of the "tone burst," filter 20 passes only the fundamental sinusoidal signal component of the squared "tone burst."

Rectifier 22 functions in a well-known manner to provide detection of the variations in an imaginary envelope that in turn is defined by variations in the peak amplitudes of the sinusoidal ac signal components appearing at the output of bandpass filter 20. The envelope is indicated in Graph 2C by the upper and lower dotted lines. In this instance, rectifier 22 is a simple half-wave rectifier, and the signal resulting therefrom is shown in Graph 2D and consists of half cycles of one polarity, in this instance negative polarity, with the peak amplitudes of these half cycles defining the lower half of the envelope.

Low-pass filter 24 receives the rectified signal from rectifier 22 and rejects fluctuations in the signal having frequencies at and higher than the predetermined frequency of the "tone burst," and passes signal components at the lesser frequencies associated with the slower varying envelope. The output signal from low-pass filter 24 appears in Graph 2E, and as shown, follows the profile of the detected envelope indicated by the dotted line in Graph 2D.

The dotted line in Graph 2E represents the magnitude of the reference signal that is applied to input 34 of comparator 26 (FIG. 1), and it is adjusted to lie generally midway between the limits of the swing of the output signal from low-pass filter 24 which is applied to input 32 of the comparator. Thus the output of comparator 26, as shown in Graph 2F, switches between its two discrete output levels as the signal from the low-pass filter 24 crosses the threshold established by the reference signal.

In this manner, the presence of "tone" or "tone burst" is represented by the transition of the output 30 of comparator 26, as it switches from one, in this instance relatively low, signal level to assume another, in this instance relatively higher, signal level.

For reasons that will become more apparent from the disclosure of the present invention hereinafter, it is to be observed from Graphs 2A and 2F that the output signal from the demodulator (Graph 2F) is delayed relative to the "tone burst" (Graph 2A) applied to the input of the demodulator. One significant factor contributing to this delay is the delayed response of the bandpass filter 20. Also, it is to be noted that the response time of bandpass filter 20, particularly the response time that permits residual oscillations to occur at its output after the end of a "tone burst", depends on the selectivity "Q" of the filter, with the response time increasing as a function of increasing selectivity (increasing "Q").

As previously discussed, demodulator circuit 16 can also be used to detect transitions in the modulations of an FSK signal. In this case, circuit 16 functions essentially in the same manner as it does in the demodulation of an ASK signal. In particular, the shift in the FSK signal from a first predetermined frequency to one or more other frequencies is sensed by detecting the presence and absence of a "tone" or "tone burst" at the first frequency. The detection of the other "tone" frequencies may be effected by additional demodulator circuits, like circuit 16, but each having a bandpass filter tuned to a separate one of the other "tones." Alternatively, a single demodulator, like demodulator circuit 16, may be provided with a modified bandpass filter that has two different, automatically selectable bandpasses, one for each "tone" frequency of the FSK signal, and with a control circuit which, after one of the "tone" frequencies has been detected, automatically switches the bandpass filter to the other available bandpass in anticipation of the receipt of the other "tone". In any case, it will be appreciated that the demodulation of an FSK signal involves basically the same circuitry and operation as the demodulation of an ASK signal.

Also previously discussed, the prior art demodulator circuit 16 can also be used with PSK signals. PSK demodulation is illustrated by the graphs in FIG. 3, depicting the operation of a circuit similar to demodulator circuit 16, except providing a full-wave rectifier 22. Full-wave rectification is more commonly used than half-wave rectification (described above) for demodulating PSK signals because full-wave rectification has proved more effective in detecting envelope variations of the bandpass-filtered signal due to shifts in phase.

With reference to FIG. 3, Graph 3A shows a modulated ac signal having a succession of three discrete shifts in phase, in this instance phase reversals. The sinusoidally varying phase-shifted ac signal applied to input 28 is converted to a square wave as shown in Graph 3B by amplitude limiter 18. The squared signal is then applied to bandpass filter 20, which passes to its output a sinusoidal component of the squared input signal as depicted in Graph 3C. As a well-known characteristic of bandpass filters, filter 20 responds to a discrete shift of the phase of the input signal by causing a transient dip in amplitude of the output signal as stored electrical energy in the filter adjusts to the new phase. This transient decrease in amplitude is shown in Graph 3C to occur several cycles after the phase shift, whereafter the signal at the output of the filter recovers to its full amplitude.

The varying amplitude ac signal appearing at the output of bandpass filter 20 is rectified by a full-wave version of rectifier 22 to produce the signal shown in Graph 3D. The rectified signal is in turn applied to low-pass filter 24 for detecting the variations in the envelope of the variable amplitude signal of Graph 3C by tracking the amplitude peaks of the rectified signal of Graph 3D, and the resulting signal available at the output of lowpass filter 24 is shown in Graph 3E. The magnitude of the reference signal shown by the dotted line in Graph 3E is adjusted to lie between the extreme values of the swing of the output signal from low-pass filter 24, so that as such output signal changes in response to the dip in amplitude of the output signal of bandpass filter 20, it crosses the threshold established by the magnitude of the reference signal and causes the output of comparator 26 to switch from one discrete output level to another.

Description of the Demodulator Circuit of the Present Invention

With reference to FIG. 4, a demodulator circuit 56 constructed in accordance with the present invention includes an amplitude limiter 58 having an input 60 that is connected to receive the modulated ac signal applied to an input 62. Amplitude limiter 58, like the previously described amplitude limiter 18 in the prior art circuit 16 shown in FIG. 1, may be either a nonlinear "clipping" circuit, or may be a linear automatic gain control circuit whose response time is slow compared to the rate of fluctuation of the modulation information.

A bandpass filter 64 has an input 66 connected to an output 68 of limiter 58 at a junction 70 so that filter 64, as in the case of bandpass filter 20 of the prior art demodulator circuit 16 of FIG. 1, receives at input 66 the amplitude-limited modulated ac signal from limiter 58 and passes to an output 72 those signal components that have frequencies falling within the bandpass of the filter. The center frequency of the bandpass is tuned to equal the predetermined frequency of the modulated ac signal that is to be received at input 62 of circuit 56.

For reasons that will be more fully explained below, it is important in selecting a circuit for use as bandpass filter 64 to determine the existence and amount of any phase shift that occurs in the ac signal between input 66 and output 72. In this case, bandpass filter 64 provides a phase shift of an angle $\pi$ (i.e., 180°), which is typical of bandpass filters.

A switching circuit 74, which in the simplified embodiment of the invention shown in FIG. 4 may be provided by a signal-controlled electronic switch, has a signal input 76 connected to output 72 of bandpass filer 64 and has a signal output 78 connected to a low-pass filter 82. A control input 80 of circuit 74 is connected to junction 70 and is responsive to positive and negative polarity swings of any signals that are presented to input 66 of bandpass filter 64. Switching circuit 74, in this embodiment, is a simple electronic switch having a closed state and an open state in which signals appearing at inout 76 are respectively conducted and not conducted to output 78. When the signal at junction 70 swings to a positive polarity, switching circuit 74 responsively assumes a predetermined one of its states, either opened or closed, and remains in that state until the signal at junction 70 swings to a negative polarity, whereupon circuit 74 responsively assumes its other switching state.

As discussed more fully herein, proper operation of switching circuit 74 for most applications requires that the phase angle $\theta$ between the squared ac signal applied to control input 80 and the sinusoidal ac signal component passed by filter 64 and applied to signal input 76, generally satisfy the relationship $\theta = n\pi$ where $n = 0, 1, 2, 3, ...$, and in this case the requisite phase relationship is provided by the above-mentioned phase shift of $1\pi$ between the input 66 and output 72 of filter 64.

A low-pass filter 82 and a comparator 84 are serially connected in that order to output 78 of circuit 74, similarly to the connection of low-pass filter 24 and comparator 26 to rectifier 22 of demodulator circuit 16 shown in FIG. 1. In particular, low-pass filter 82 has an input 86 connected to output 78 of circuit 74, and has an output 88 connected to a first input 90 of comparator 84. A second input 92 of comparator 84 is connected to receive a reference signal. An output 94 of comparator 84, which is connected to an output 96 of the demodulator circuit 56, switches between two discrete output levels depending upon whether the signal at input 90 lies above or below the magnitude of a reference signal applied at input 92. Low-pass filter 82 and comparator 84 may be provided by the same circuits that have been heretofore used for low-pass filter 24 and comparator 26 in the prior art demodulator circuit 16 of FIG. 1.

Operation of the demodulator circuit of the present invention

In the operation of circuit 56 during demodulation of ASK or FSK signals, a "tone" or "tone burst" of a modulated ac signal applied to input 62 is first amplitude limited by limiter 58, then band-pass filtered by filter 64. Switching circuit 74 functions to alternately switch between its open and closed states, in response to the squared "tone" signal at junction 70, to effect a detection of the envelope of the ac signal components passed by filter 64 that is like the detection performed by a half-wave rectifier. Thus, for a steady "tone" at input 62, switching circuit 74 provides an equivalent operation to that of a half-wave rectifier detector. Low-pass filer 82 and comparator 84 respond to the detected envelope of the "tone" to cause output 96 to assume the output level that indicates the presence of "tone". Thus far, for a steady "tone" circuit 56 provides an output response that is equivalent to that of the prior art demodulator circuit 16 of FIG. 1.

However, the operation of demodulator circuit 56 is significantly different from that of the prior art circuit in the following cases: 1) when the modulated ac signal at input 62 is at a zero amplitude, either because it is observed during an interval between "tone bursts," or during an absence of "tone." or because there has been a temporary loss or removal of the modulated input signal at input 62, and 2) at each shift in the modulation of the input signal, as represented by discrete transitions in amplitude, of the ac signal. In these cases, switching circuit 74, by virtue of the coupling of its control input 80 to signals appearing at input 66 of bandpass filter 64 effectively detects ac signal components passed to circuit 74 by filter 64 only when such ac signal components are the result of a true "tone" or "tone burst" signal applied to input 62. This operation and its advantages are best illustrated by reference to the graphs shown in FIGS. 5 – 9.

In FIG. 5, graph 5A shows the squared ac signal output from amplitude limiter 58 when a "tone burst" of an ASK modulated signal is applied to input 62. This squared ac signal appears at junction 70 and is applied to input 66 of filter 64. In response thereto, filter 64 passes to its output 72 the fundamental sinusoidal signal component of the squared "tone burst," which is shown in Graph 5B. This output signal from filter 64 builds up in amplitude in accordance with the finite time constant of the filter, and in response to the end of the "tone burst" decays gradually, again in accordance with the finite time constant of the filter.

As described above, switching circuit 74 is constructed so that its control input 80 responds to one polarity of half cycles of the squared "tone burst" at junction 70 to assume its open state and responds to the other polarity of half cycles of the squared "tone burst" at junction 70 to assume its closed state. Thus circuit 74 is switched between its states at the frequency of the ac cycles that make up the "tone burst," By virtue of the phase relationship of $\theta = 1\pi$ between the signals applied to control input 80 and signal input 76, switching circuit 74 is switched to its closed state during alternate half cycles of the ac signal component at the output 72 of bandpass filter 64, such that only the negative portions of the signal are conducted to output 78 of circuit 74 and hence to input 86 of low-pass filter 82 as a rectified-like signal. The phase relationship between the signals at control input 80 and signal input 76 of switching of circuit 74 could alternatively be such that the positive half cycle portions of the ac signal components from bandpass filter 64 are conducted to low-pass filter 82, and it will be noted that in such case the phase angle relationship of $\theta = n\pi$ is still satisfied.

By comparing the rectified-like signal in Graph 5C with the signal in Graph 2D, it is observed that switching circuit 74 provides a detection function in response to the leading and steady-state portions of the "tone burst" that is essentially equivalent to the detection by rectifier 22 in the prior art demodulator circuit 16 of FIG. 1. However, at the end of the "tone burst," the operation of switching circuit 74 is quite different from that of an ordinary rectifier detector such as used in circuit 16. When the "tone burst" ends, the squared "tone burst" (diagram 5A) also terminates and the control output of circuit 74 no longer receives an alternating switching signal. Consequently, circuit 74 assumes either its open or closed state and remains in such assumed state. In this instance, as illustrated in diagram 5C, switching circuit 74 assumes its open state at the end of the "tone burst," and accordingly the residual decaying ac signal component shown in Graph 5B, representing the output signal from bandpass filter 64, is cut off by switching circuit 74. Hence the rectification-like detection by switching circuit 74 abruptly ceases, as shown in Graph 5C. Low-pass filter 82 and comparator 84 respond to the loss of the detected output from circuit 74 and cause the signal at output 96 to switch to the level that represents the absence of "tone."

It is thus observed that the response of demodulator circuit 56 to the end of a "tone" or a "tone burst" substantially faster than the response of the prior art demodulator circuit 16, because detection of the residual and decaying ac signal component from bandpass filter 64, due to its finite time constant, is cut off as soon as the squared "tone burst" terminates at the input 66 to filter 64. Because the speed of circuit 56 in responding to the end of "tone burst" has been enhanced, it is possible to increase the modulation rate of the modulated ac signal applied to input 62, which in turn makes it possible to transmit and receive information at an increased rate.

In the operation depicted by the graphs of FIG. 5, it is assumed that switching circuit 74 comes to rest in an open state at the end of the "tone burst". However, this assumption is arbitrary, and the circuit will provide essentially the same fast response whether the switching circuit 74 assumes a closed state at the end of tone, an open state at the end of tone, or switches back and forth between the open and closed states at random in response to the presence of noise at junction 70.

Figure 6:
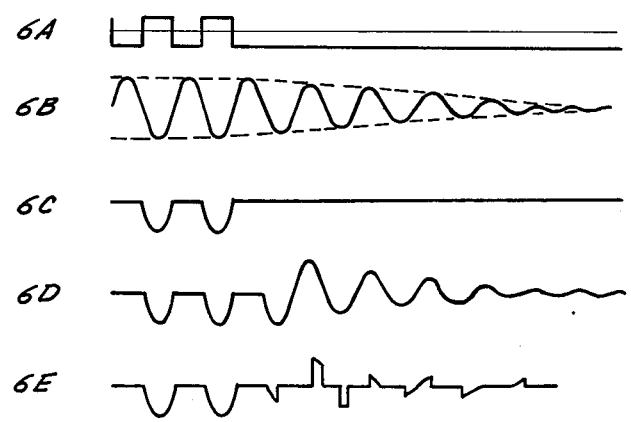
FIG. 6 is still another set of graphs, 6A – 6E illustrating a family of waveforms that depicts various possible operating modes of the demodulator of the present invention in response to the end of a "tone" (i.e., the modulation transition of an ASK signal between its predetermined non-zero amplitude and zero amplitude).

These various possibilities are depicted by the set of graphs shown in FIG. 6. Graph 6A represents the last few cycles of a squared "tone burst" at junction 70 and thus at input 66 of filter 64. Graph 6B represents the residual decaying sinusoidal ac signal component at the output of bandpass filter 64 in response to the end of "tone burst." Graphs 6C, 6D, and 6E represent in that order the various possible operating modes of switching circuit 74 at the end of the "tone burst". These modes include: circuit 74 assuming its open state (Graph 6C); circuit 74 assuming its closed state (Graph 6D); and circuit 74 switching back and forth between its open and closed states at random, such as might occur in response to the presence of high-amplitude noise at junction 70. The open state condition depicted in Graph 6C has been described above in connection with FIG. 5. In Graph 6D, circuit 74 comes to rest in its closed state, and thereby continuously conducts the residual decaying ac signal from bandpass filter 64 to the low-pass filter 82. Since this conducted signal includes both positive and negative portions, they self-cancel in low-pass filter 82 and allow filter 82 to rapidly respond at its output 88 in substantially the same manner as if circuit 74 had assumed its open state. In Graph 6E, the switching circuit 74 switches back and forth between its states; however, since the switching is at random, it will on the average conduct equal amounts of positive and negative portions of the decaying ac signal to the input of low-pass filter 82. Again, the net result is the cancellation of the positive and negative signal portions in low-pass filter 82, allowing its output 88 to respond in substantially the same manner that it does when the switching circuit 74 comes to rest in its open state.

Demodulator circuit 56 is also less susceptible to producing a false output signal when large amplitude wide-band noise is present at input 62 and when there is an absence of "tone" either during the interval between "tone bursts" or during temporary removal or loss of modulated signal at input 62. The reasons for the lack of sensitivity to noise is illustrated by the set of graphs in FIG. 7. Graph 7A shows the signal that appears at junction 70 when amplitude limiter 58 receives randomly varying noise energy at input 62 and hence at input 60. In the case of wide-band noise, some of the noise energy will be at frequencies within the bandpass of filter 64 and will cause the output 72 of the filter to "ring" as it responds to the stimulus of the squared noise signal at input 66. The result is a variable-amplitude signal component depicted in Graph 7B, having a frequency that corresponds to the center frequency of the bandpass of filter 64. If the signal component illustrated in Graph 7B were detected by a conventional rectifier detector such as used in the prior art demodulated circuit 16 of FIG. 1, it will cause a change in voltage at the output of low-pass filter 24 that may trigger a false switching of comparator 26.

Figure 7:
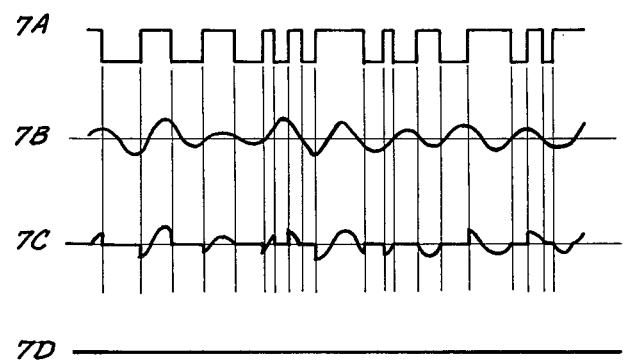
FIG. 7 is a set of graphs, 7A – 7D, illustrating a family of waveforms that depicts the response of the demodulator circuit of the present invention to large-amplitude wide-band noise appearing at the input to the demodulator.

In the demodulator circuit 56 of FIG. 4, the switching circuit 74 prevents the detection of the alternating current signal shown in Graph 7D of FIG. 7 because the circuit 74 is switched between its states at random in response to the randomly varying squared noise signal at junction 70. Because of the random switching of circuit 74, equal positive and negative polarity portions of the output signal from filter 64 will be conducted to the low-pass filter 82, which in turn will average out to zero, such that the output 88 from the low-pass filter will remain unchanged.

Figure 8:
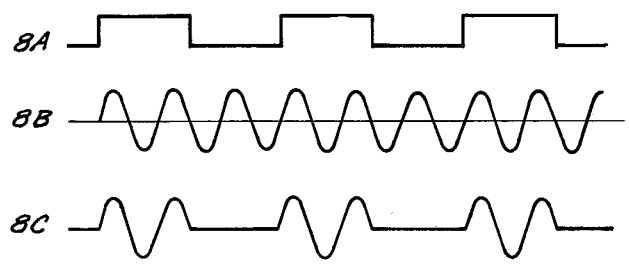
FIG. 8 is a further set of graphs, 8A – 8C, illustrating a set of waveforms that depicts the response of the demodulator circuit of the present invention to a spurious signal having a frequency that is a subharmonic of the frequency of the ac signal to be demodulated.
Figure 9:
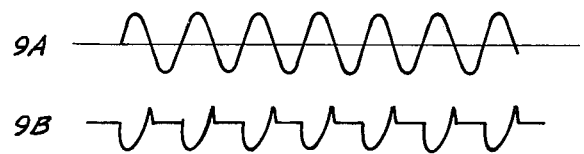
FIG. 9 is a further set of graphs, 9A and 9B, illustrating two waveforms that occur in the demodulator of the present invention in response to an input signal having a frequency that is close to, but not the same as, that of the modulated ac signal.

Furthermore, demodulator circuit 56 of FIG. 4 is less susceptible to producing a false switching at its output when input 62 receives signals at frequencies that are subharmonics of the center frequency of bandpass filter 64. This operation is illustrated in FIG. 8, in which Graph 8A shows a signal that appears at junction 70 after amplitude limiter 58 has squared a sinusoidally varying ac signal applied at input 62 that is at a frequency of one-third that of the anticipated "tone" frequency and thus one-third of the center frequency of bandpass filter 64. Bandpass filter 64, however, responds to the strong stimulus of the subharmonic and produces a spurious ac signal at output 72 having a frequency equal to the center frequency of filter 64. If the ac signal at output 72 of filter 64 were detected by a conventional rectifier detector, as used in prior art demodulator circuit 16, it is likely that a false output would be produced because of the buildup of half cycles of the same polarity in the low-pass filter 24.

In contrast, demodulator circuit 56 causes switching circuit 74 to switch at the frequency of the squared signal (Graph 8A) appearing at junction 70, and since it is at a frequency of one-third that of the output signal from band pass filter 64, circuit 74 conducts one-and-a-half cycles of the latter signal to low pass filter 82. The result is that most of the signal portions conducted to low-pass filter 82 are cancelled, leaving only a small majority of positive half cycles uncancelled. These will cause only a small change in the voltage at output 88 from filter 82, insufficient to cause comparator 84 to switch output levels.

A further advantage of the demodulator circuit 56 shown in FIG. 4 is its improved selectivity in responding to the desired "tone" frequency to which the bandpass filter 64 is tuned. Selectivity refers to the degree to which the circuit is capable of rejecting spurious input signals that have a frequency close to but not equal to the predetermined frequency of the "tone," and the improvement in the selectivity is best described in conjunction with the graphs of FIG. 9. Graph 9A shows a spurious ac signal applied to input 62 of demodulator circuit 56, wherein the ac signal has a frequency different from but sufficiently close to the "tone" frequency such that a portion of the spurious signal will be passed to output 72 of bandpass filter 64. As previously described, detection of the presence of "tone" will in most applications be best effected when the phase relationship $\theta = n\pi$ is satisfied between the control input 80 and the signal input 76 of circuit 74 for signals having a frequency equal to the center frequency of the bandpass filter.

Furthermore, most bandpass filters suitable for the invention (an example of a suitable filter is shown and described in connection with FIG. 11) have a phase shift between their input and output that varies as a function of the frequency of the input signal. For example, if the phase shift is 180°, i.e., $1\pi$ for signals at the center frequency of the filter, the phase shift may vary to 135° and 225°, respectively, at off-center frequencies at which the output response of the filter has fallen 3 dB. With this characteristic in mind, reference is made to Graph 9B of FIG. 9 which shows the output signal from switching circuit 74 when the spurious input signal shown in Graph 9A is at a frequency that causes a phase shift somewhat in excess of the normal 180°. As illustrated in Graph 9B, the timing of the closed state of the switching circuit 74 is not precisely coterminous with the negative half cycle of the output signal from bandpass filter 64. and accordingly a fragment of the positive half of the cycle is also conducted to the low-pass filter. The conduction of these positive signal fragments partially negates the effectiveness of the detection function performed by switching circuit 74. Accordingly, as the phase shift of the filter 64 deviates from 180° when the frequency of the input signal moves away from the filter's center frequency, the detection function of circuit 64 becomes less effective and the response of the demodulator circuit 56 falls off. A sharper frequency-dependent falloff is thus achieved than when the selectivity of the bandpass filter 64 is the sole selectivity-determining factor.

The foregoing operation and noted advantages of demodulator circuit 56 apply to amplitude-modulated ac signals in which the amplitude undergoes discrete changes, for example, from zero amplitude to a predetermined non-zero amplitude, as in the case of ASK signals and Tone-Coded Squelch Signals.

Also, demodulator circuit 56 operates to recover modulation information from frequency-modulated ac signals that have discrete shifts in frequency. Examples of this type of signal are FSK signals and Dual-Tone Multi-Frequency Signals. The operation in this case is basically the same as described above, except that demodulator circuit 56 will be used to detect the presence or absence of one of two or more predetermined signal frequencies that make up the modulated ac signal.

Figure 10:
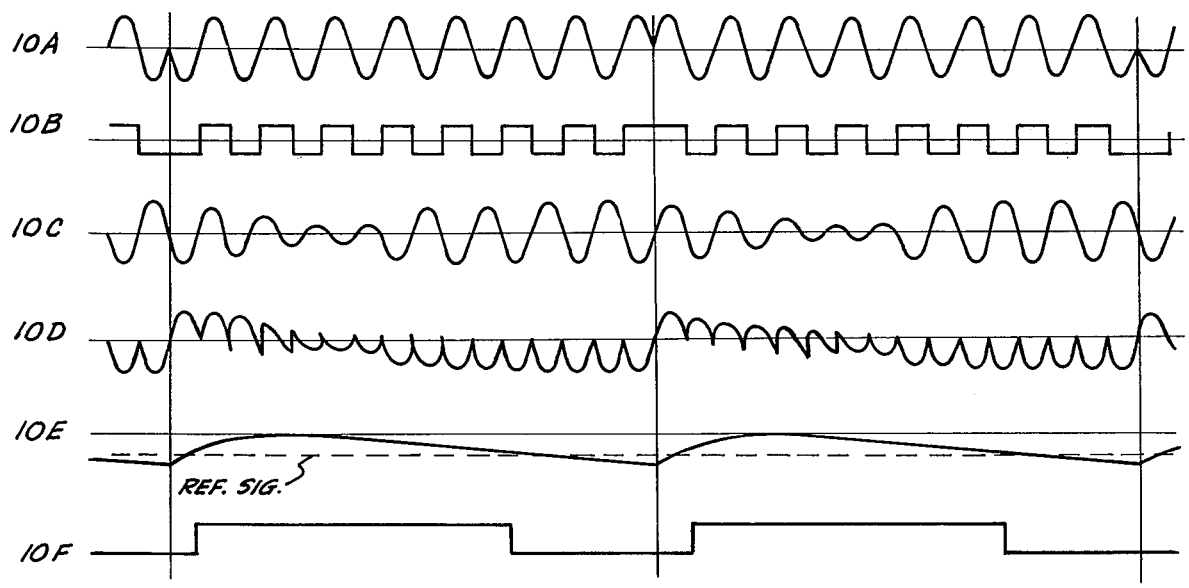
FIG. 10 is a set of graphs, 10A – 10F, illustrating a family of waveforms that depict the operation of the demodulator circuit of the present invention when used for demodulating PSK signals.

The operating characteristics and advantages of demodulator circuit 56 for demodulating discretely phase-modulated ac signals, such as PSK signals, require further discussion. The response of demodulator circuit 56 to a PSK signal applied at input 62 is best described by reference to the set of graphs in FIG. 10, which illustrate the operation of a demodulator circuit similar to circuit 56, but wherein switching circuit 74 has been modified to perform a full-wave rectification-like detection. As described more fully herein, this modification provides circuitry that in lieu of an open switching state, provides for first inverting the polarity of the signal appearing at output 72 of filter 64 and then applies such inverted polarity signal to the input 86 of low-pass filter 82. An example of such a modified switching circuit is described below in connection with FIG. 11.

Graph 10A depicts three successive 180° phase reversals in a phase-modulated ac signal that has been applied to input 62. Graph 10B shows the resulting signal as it appears at junction 70 and as it is applied to input 66 of bandpass filter 64 after the input signal has been squared by amplitude limiter 58. The output of bandpass filter 64 is depicted in Graph 10C. The first three waveforms, shown in Graphs 10A, 10B, and 10C, are the same as the waveforms depicted in Graphs 3A, 3B, and 3C of FIG. 3, previously described in connection with the operation of prior art demodulator circuit 16 of FIG. 1.

However, the operation of circuit 56 commencing with the showing in Graph 10D is different from the operation of circuit 16 because of the response of switching circuit 74 to the abrupt transition in phase of the signal at control input 80. In particular, the steady-state phase relationship between the ac signal (during an interval between phase shifts) and the ac signal component passed to the output 72 of bandpass filter 64 is disrupted at and immediately after the abrupt shift in phase of the phase-modulated ac signal. As shown in Graph 10B, this disruption in the phase relationship causes switching circuit 74 to be held in one of its switching states for an interval that allows a positive-polarity half cycle of the output signal from filter 64 to be conducted to the low-pass filter. Thereafter, the phase relationship between the switching of circuit 74 and the output signal from bandpass filter 64 causes several more half cycles of positive polarity to be passed to the low-pass filter 82. As bandpass filter 64 gradually adjusts to the new phase of the input signal, the amplitude of the output signal temporarily diminishes as described above in connection with FIG. 3. When the steady-state phase relationship between the squared ac signal at junction 70 and the sinusoidal ac signal at the output 72 of bandpass filter 64 is restored, switching circuit 74 operates to apply only negative half-cycle waveforms to the input 86 of low-pass filter 82. It will be observed that immediately after the phase shift of the modulated signal at input 62, switching circuit 74 applies a series of positive-polarity half cycles to the input 86 of filter 82. These positive half cycles negate the buildup in filter 82 of the negative half cycles applied by switch 74 during its steady-state response to the input ac signal, forcing the signal at output 88 of filter 82 to rapidly decrease toward zero. In fact, the signal at output 88 from filter 82 decreases to, or approximately to, zero and thereafter gradually increases back to a maximum negative value as the demodulator resumes a steady-state operation.

Because of the abrupt reversal in the polarity of signals applied to the low-pass filter 82 by switching circuit 74 in response to the phase shift of the modulated input signal, the signal at the output of low-pass filter 82 has a more rapid and larger amplitude swing than the swing of the signal at the output of the low-pass filter 24 in the prior art demodulator circuit 16 of FIG. 1. Because of the greater swing in amplitude, the magnitude of the reference signal applied to input 92 of comparator 84 of demodulator circuit 56 can be set at a level that provides a better discrimination by comparator 84 between a true phase shift of the modulated ac input signal and noise and other signal interference. Also, the more rapid response at the output of filter 82 enables the use of a faster data transmission rate.

Although the foregoing description pertains to a two-state PSK signal, i.e., a signal having two different phases, the invention is also useful for demodulating multistate PSK signals in which there are three or more discrete phases.

Also in some applications of demodulator 56, adequate or even optimum operation will be obtained without satisfying exactly the phase relationships of $\theta = n\pi$ between the signal and control inputs of switching circuit 74. For example, in demodulating multiple-state PSK signals it may be that the greatest swing of the output signal from low-pass filter 82 is achieved when $\theta$ is adjusted to be somwhat off of the phase angle $n\pi$.

Description of Preferred Embodiment of the Demodulator Circuit of the Invention

Figure 11:
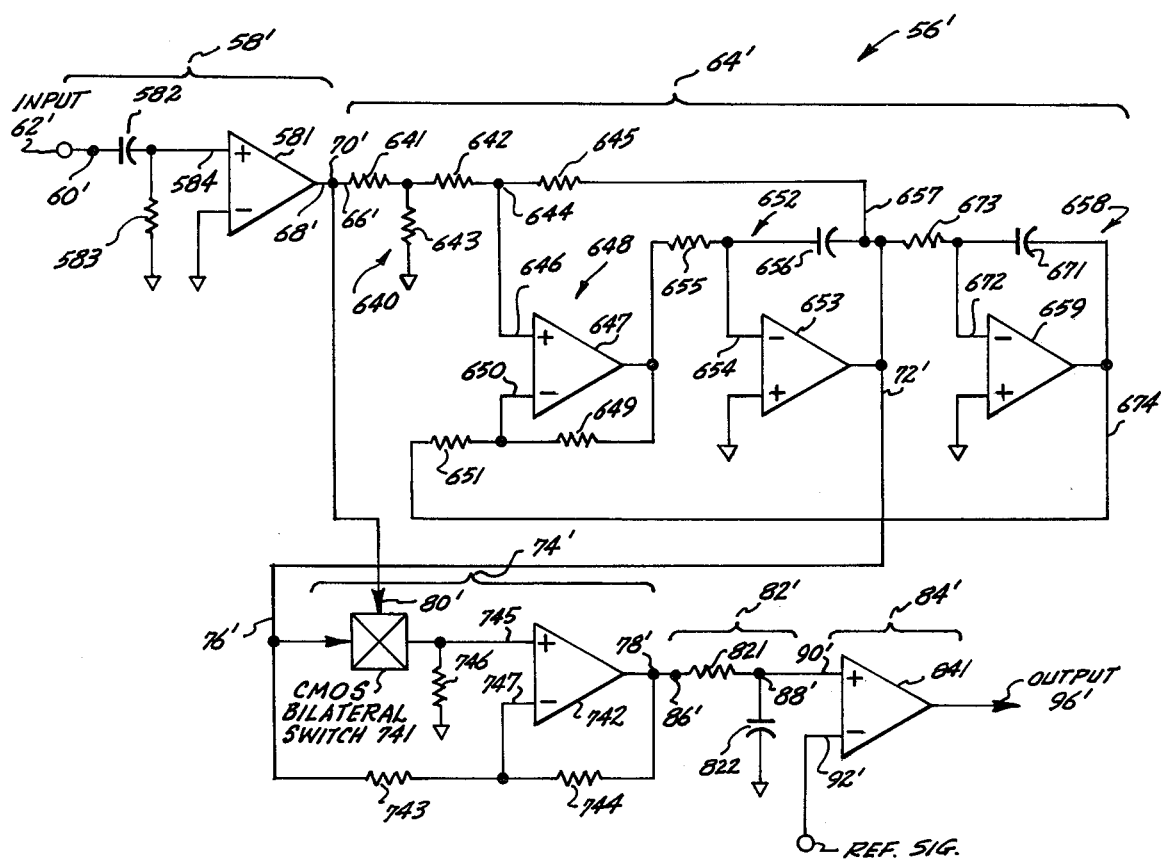
FIG. 11 is a detailed schematic diagram of one preferred form of the demodulator circuit in accordance with the present invention.

With reference to FIG. 11, a preferred form of the invention is shown by a demodulator circuit 56', in which like reference numerals have been used with the addition of a prime notation to indicate correspondence between the components of FIG. 11 and FIG. 4. Thus amplitude limiter 58' is connected to an input 62' and includes an operational amplifier 581 connected as a comparator and an RC network including a capacitor 582 and a resistor 583 connected between an input 60' of limiter 58' and a noninverting input 584 of operational amplifier 581. In operation, when a small positive-going signal is received at input 60', capacitor 582 applies the positive voltage to input 584, causing the output of amplifier 581 at output 86' to swing high to the saturated output voltage level of operational amplifier 581. Similarly, a small negative polarity at input 60' is applied to input 584 via capacitor 582 to cause the output of operational amplifier 581 to swing low. Alternating polarity input signals are thus converted into a square wave of constant amplitude.

Bandpass filter 64' is a conventional, three-stage, state-variable, active bandpass filter. In particular, filter 64' includes a resistive divider network formed of resistors 641, 642, and 643 connected in a T-configuration, in which the lower end of resistor 643 is connected to ground, the lefthand end of resistor 641 is connected to input 66' of the filter 64', and a righthand end of resistor 642 is connected to a junction 644 that serves as a summing junction for an input signal via resistor 642 and a feedback signal from a downstream filter stage via resistor 645. The sum of these signals is applied to a noninverting input 646 of an operational amplifier 647 of a first operational amplifier stage 648. A feedback resistor 649 is connected betwween an output of amplifier 647 and an inverting input 650, and an input resistor 651 is connected to apply a feedback signal from a downstream stage to input 650.

A second operational amplifier stage 652 is connected as an integrator and includes an operational amplifier 653, having an inverting input 654 connected to an input resistor 655. The opposite end of resistor 655 is connected to the output of the first amplifier stage 648 at the output of operational amplifier 647. A feedback capacitor 656 is connected between an output of amplifier 653 and its inverting input 654. The output of stage 652 produces a signal that is fed back over a line 657 through resistor 645 to summing junction 644.

The third operational amplifier stage 658 is also connected as an integrator and includes an operational amplifier 659, a feedback capacitor 671 connected between the output of amplifier 659 and an inverting input 672, and an input resistor 673 that connects the output of the second stage 652 to the input 672 of the third stage 658. The output of stage 658 appearing at the output of operational amplifier 659 is fed back over a line 674 to the inverting input 650 of the first stage via resistor 651. Output 72' from bandpass filter 64' is taken from the output of the second stage 652 at the output of operational amplifier 653.

Bandpass filter 64' can be designed to pass any of a wide range of tone frequencies that are to be demodulated by circuit 56'. As an example, the various components of filter 64' may be selected so as to have a center frequency of 100 Hz, which would be suitable, for example, in a demodulator circuit used in a subaudible tone-coded squelch system. The selectivity factor "Q" for such a circuit may be about 30, to give a 3-dB bandpass of roughly 3% of the center frequency. The operational amplifier stages 648, 652, and 658 of filter 64' in this example may provide an overall gain that produces a peak-to-peak voltage of 2 volts of the signal at output 72' when the "tone" (100 Hz) is present at input 62'. This gain may be obtained by adjusting the values of the resistive divider network 640 at the input of filter 64'. Bandpass filter 64' constructed in this manner provides a phase shift between its input 66' and its output 72' of $1\pi$ (or 180°).

The tuning of filter 64' can be accomplished in a variety of ways, including the provision of a variable trimming potentiometer in place of one of the "integrator" input resistors e.g., resistors 655 and 673 as is well known to those skilled in the art. In many cases a preferred method is to replace the input and feedback resistors 651 and 649, respectively, of amplifier 647 by a trimming potentiometer, with the wiper going to the inverting input 650. Often the further provision of fixed resistors in series with the trimming potentiometer is desirable to restrict the range of adjustment. In any case, this method, given judicious choice of the ratio of feedback to input resistance of between say 0.5 and 2, allows a wide range of frequency adjustment e.g., one octave, without overly affecting the Q selectivity factor.

It will be appreciated that the foregoing description applies to one particular example of bandpass filter 64'. A wide variety of filter designs may be used in practicing the invention, including designs that provide an adjustable center frequency and designs that provide a different phase shift from that specified above, so long as the phase relationship at the signal input 76' and control input 80' of circuit 74' satisfies the phase relation $\theta = n\pi$ as described above.

Preferably, switching circuit 74' is constructed to provide a full-wave rectification-like operation. This is particularly true when demodulator circuit 56' is used to recover information signals from a phase-modulated ac signal, such as in a PSK system. For this purpose, switching circuit 74' includes a bilateral electronic switch 741, that, for example, may be provided by a CMOS bilateral solid-state switch, and an operational amplifier 742 having associated input and feedback resistors 743 and 744, respectively. Input 76' splits into two signal paths, a first path connected through bilateral switch 741 to the noninverting input 745, with a resistor 746 connected from input 745 to ground, and a second path connected through input resistor 743 to the inverting input 747 of amplifier 742.

In this manner, switch 741 responds to a control signal at input 80' to alternately assume a closed condition permitting current to flow in both directions between input 76' and the noninverting input 745 of amplifier 742, and on an open condition disconnecting input 76' from input 745 of amplifier 742. When switch 741 is in its closed condition, the signals at input 76' are applied through switch 741 to the noninverting input 745 and hence appear at the output 78' as signals of the same polarity as received at input 76'. When switch 741 is in the open condition, the circuit acts as an inverting amplifier circuit, in which signals received at input 76' are conducted through resistor 743 to the inverting input 747 of amplifier 742 and hence appear at output 78' as signals equal but of opposite polarity to the signals received at input 76'.

When an ac signal is applied to demodulator circuit 56' at the predetermined frequency of the bandpass filter 64', switch 741 is operated at the frequency of the ac signal and with a phase relationship as specified above for switch 74 of FIG. 4, to cause circuit 74' to periodically assume its closed condition to pass alternate half cycles of one polarity, such as the negative polarity half cycles, between input 76' and output 78' without polarity inversion, and alternately therewith assume its open condition, in which circuit 74' functions as a polarity inverter, to invert the positive half cycles presented at input 76' so that they appear as negative half cycles at output 78'.

CMOS bilateral switch 741 is provided by a complementary pair of field-effect devices that are capable of being turned on by a signal at control input 80', so that they pass current between their inputs and outputs in either direction with very low resistance, and are capable of being switched off to provide a virtual open circuit in which a very high impedance is established between the input and output. The switching characteristics of CMOS bilateral switch 741 are more particularly illustrated and described herein in connection with FIG. 12.

Low-pass filter 82' is a single-pole RC network, including resistor 821 and capacitor 822. This simple filter has been found suitable for most applications. For a demodulator circuit 56' having a bandpass filter 64' designed to demodulate a 100-Hz "tone", as in the above-mentioned example, a suitable RC time constant for low-pass filter 82' is about 33 milliseconds. This particular time constant will provide a rolloff frequency of about 5 Hz, so that signal components varying at frequencies greater than 5 Hz, and in particular the signal components varying at and above the predetermined "tone" frequency, will be filtered out by filter 82'.

Comparator 84' is provided by an operational amplifier 841 connected without feedback, so that its output and hence output 96', swings in a discrete fashion between high and low voltage levels, depending upon the relationship between the signals at inputs 90' and 92'. In particular, the signal from low-pass filter 82' is applied to the noniverting input 90' of amplifier 841, and the reference signal is connected to the inverting input 92'.

Again with reference to the above-mentioned example in which demodulator circuit 56' is designed to detect "tones" of 100 Hz, and filters 64∝ and 82' have the abovementioned characteristics, the presence of a 100-Hz tone at input 62' wll produce a negative voltage swing at input 90' of approximately 637 millivolts. By choosing a magnitude of the reference signal of about −328 millivolts, the output voltage from operational amplifier 841 will be high when no "tone" is received at input 62' and will switch low when "tone" is received.

The selection of the magnitude of the reference signal determines, in part, the bandwidth of frequencies detected by circuit 56'. The suggested choice of a reference voltage in the above example provides a detection bandwidth of approximately 3%. That is, the frequency of the input tone can vary ± 3 Hz for a 100-Hz "tone," before the output from the low-pass filter will rise above the −328 millivolts at input 92' and cause the output of comparator 84' to switch high. Preferably, the selection of the magnitude of the reference voltage is such that the switching point of comparator 84', in response to deviations of the input frequency, is at or close to the 3 dB points of the combined frequency-dependent responses of bandpass filter 64' and switching circuit 74'. As mentioned above, the frequency-dependent characteristics of the output of switching circuit 74', caused by the variations in phase shift in bandpass filter 64', cause an additional 3 dB dropoff at the output of switching circuit 74' for the frequencies lying at the 3-dB points of bandpass filter 64'. Thus at the edges of the bandpass of filter 64' the amplitude of the signal at the output of switching circuit 74' has dropped 6 dB (3 dB in filter 64' plus 3 dB in switching circuit 74'). Accordingly, the magnitude of the reference signal should be adjusted so that the switching point of comparator 84' coincide with the edges of the bandwidth defined by the combined frequency-dependent operations of filter 64' and switching circuit 74', or in other words, at the 6 dB frequency points as measured at the output 78' of switching circuit 74'.

With reference to FIG. 12, the switching characteristics of circuit 74' are illustrated, in which Graph 12A depicts the last few cycles of a squared "tone" signal as it appears at junction 70' and as it is applied to control input 80' of circuit 74'. CMOS bilateral switch 741 is responsive to the voltage at control input 80', such that when the voltage goes positive and crosses a predetermined positive threshold indicated by dotted line 101 in Graph 12A, switch 741 assumes its closed state and remains in that state until voltage at input 80' swings negative and crosses a predetermined negative threshold indicated by dotted line 102. After crossing the negative threshold indicated by dotted line 102, switch 741 assumes its open state and remains in that state until the signal at junction 70' again swings positive and crosses the positive threshold indicated by dotted line 101.

Switch 741 may also be switched between its opened and closed states by a randomly varying noise energy appearing at junction 70', if such noise energy has sufficient amplitude to exceed the thresholds indicated by dotted lines 101 and 102. In such case and as more fully described above, switching circuit 74' will switch back and forth at random and will not effectively detect the output signal from bandpass filter 64'.

The signal shown in Graph 12B represents the sinusoidal ac signal component from bandpass filter 64', including the residual decaying portion that occurs after the termination of the squared "tone" signal of Graph 12A. The signal of Graph 12B is applied to the signal input 76' of switching circuit 74'. In response to the squared "tone" signal at junction 70', switching circuit 74' alternately switches between its first and second states to perform the previously described detection function. In particular, negative half cycles 103, 104, and 105 shown in Graph 12C are the negative half cycles 106, 107, and 108 of the output signal from bandpass filter 64', as shown in Graph 12B, that are passed by switching circuit 74' when switch 741 assumes its closed state in response to the positive-going half-cycle portions of the squared "tone" signal shown in Graph 12A. The other negative half cycles 109 and 110 in Graph 12C are the inverted-polarity positive half cycles 111 and 112 of the waveform depicted in Graph 12B, that are the result of switch 741 assuming its open state in response to the negative-going half cycles of the squared "tone" signal at junction 70'.

At the end of the "tone," the squared signal at junction 70' ceases to alternate between positive and negative values and assumes a constant negative value that causes switch 741 to remain in its open state. In this state, switching circuit 74' inverts the signal applied at its input 76', and passes this inverted-polarity signal to output 78', where it appears as a signal 113 of equal magnitude but opposite phase to the residual signal component shown in Graph 12B.

While only particular embodiments of the invention have been disclosed herein, it will be readily apparent to persons skilled in the art that numerous changes and modifications can be made to the disclosed embodiments without departing from the spirit of the invention, which is defined in the claims set forth hereinafter. For example, the demodulator circuit (56, 56') has included an amplitude limiter and an output comparator stage, which are preferred for most applications. However, if the amplitude of the input "tone" is sufficiently uniform because, for example, it has not been subjected to radio transmission, then it may be desirable to eliminate amplitude limiter (58, 58') and apply the modulated signal directly to the input of the bandpass filter (64, 64') and thus directly to the control input of the switching circuit (74, 74'). Also, the signal variations at the output of the low-pass filter (82, 82') may be used directly in some applications without processing the output signal through the comparator (84, 84'). Still another contemplated modification is that of replacing the CMOS bilateral switch 741 of switching circuit 74' in the embodiment of FIG. 11 with a bipolar transistor, that will be connected to operational amplifier 742 in a well-known manner, so as to function as a switchable, low-impedance shunt to ground at the noninverting input of the operational amplifier. Such a circuit will cause the operational amplifier to alternately assume inverting and noninverting characteristics depending upon whether the bipolar transistor is switched on or off, respectively.

What is claimed is:

1. A demodulator circuit for recovering an information signal from a modulated ac signal which has been modulated by discrete changes in one of the following: amplitude, frequency, and phase, and which during at least certain intervals has a predetermined frequency and a non-zero amplitude, comprising:

a bandpass filter means having an input for receiving said modulated ac signal and having an output, said bandpass filter means selectively passing to said output those components of signals received at said input that have frequencies which fall within a predetermined bandpass centered about said predetermined frequency;

switching circuit means having a signal input, a signal output and a control input, said signal input being connected to said output of said bandpass filter means, and said control input being connected to said input of said bandpass filter means, said switching circuit means being responsive to signals appearing at said input of said bandpass filter means to alternately switch between a first state and a second state at a frequency and phase so related to those components of said modulated ac signal passed to said output of said bandpass filter means so that when said modulated ac signal has said predetermined frequency and said non-zero amplitude said switching circuit means is switched between said states so as to cause, between said signal input and said signal output, a rectification-like detection of those components of said modulated ac signal passed to said output of said bandpass filter means; and a low-pass filter means connected to said signal output of said switching circuit means for filtering from the detected components of said modulated ac signal those signal frequencies at and above said predetermined frequency so as to pass only signals that represent said discrete changes in said modulated ac signal, and thus represent said information signal.

2. The demodulator of claim 1, wherein said switching circuit means is switched between said states at a phase angle $\theta$ relative to the phase of those components of said modulated ac signal passed to said output of said bandpass filter, where $\theta$ generally satisfies the relationship of $\theta = n\pi$, and $n = 0, 1, 2, 3, \ldots$.

3. The demodulator circuit of claim 1, further comprising:

means for producing a reference signal, and comparator means for comparing the magnitude of the signal passed by said low-pass filter means with the magnitude of said reference signal, said comparator means having an output at which an output signal is produced that assumes a first discrete level when the magnitude of the signal passed by said low-pass filter means exceeds the magnitude of said reference signal and that assumes a second discrete level when the magnitude of the signal passed by said low-pass filter means is below the magnitude of said reference signal.

4. The demodulator circuit of claim 1, further comprising an amplitude limiter means for receiving said modulated ac signal and applying it to said input of said bandpass filter means, said amplitude limiter means limiting said modulated ac signal to a uniform maximum amplitude.

5. The demodulator circuit of claim 1, wherein said switching circuit means includes means that is effective in said first state to conduct signals between said signal input and said signal output, and that is effective in said second state to block signals from being conducted between said signal input and said signal output so that when said modulated ac signal is at said predetermined frequency and non-zero amplitude, said switching of said switching circuit means between said first and second states is effective to cause a half-wave rectification-like detection of said signal components of said modulated ac signal passed to said output of said bandpass filter means.

6. The demodulator circuit of claim 1, wherein said switching circuit means includes means that is effective in said first state to conduct signals between said signal input and said signal output, and that is effective in said second state to invert the polarity of signals at said signal input and conduct such inverted-polarity signals to said signal output, so that when said modulated ac signal is at said predetermined frequency and non-zero amplitude said switching of said switching circuit means between said first and second states is effective to cause a full-wave rectification-like detection of said signal components of said modulated ac signal passed to said output of said bandpass filter means.

7. The demodulator circuit of claim 1, wherein said modulated ac signal is amplitude-modulated by discrete changes between said predetermined non-zero amplitude and a second predetermined amplitude, and further comprising:
means for producing a reference signal, and comparator means for comparing the magnitude of the signal passed by said low-pass filter means with the magnitude of said reference signal, said comparator means having an output at which an output signal is produced that assumes one discrete level when the magnitude of the signal passed by said low-pass filer means is greater than the magnitude of said reference signal and that assumes another discrete level when the magnitude of the signal passed by said low-pass filter means is less than the magnitude of said reference signal, the magnitude of the signal passed by said low-pass filter means varying between magnitudes that are greater and lesser than that of said reference signal as said modulated ac signal changes between said predetermined non-zero amplitude and said second predetermined amplitude.

8. The demodulator circuit of claim 7, wherein said second predetermined amplitude of said modulated ac signal is zero amplitude.

9. The demodulator circuit of claim 7, wherein said modulated ac signal is an ASK signal.

10. The demodulator circuit of claim 1, wherein said modulated ac signal is frequency-modulated by discrete changes between said predetermined frequency and another frequency, and further comprising:
means for producing a reference signal, and comparator means for comparing the magnitude of the signal passed by said low-pass filter means with the magnitude of said reference signal, said comparator means having an output at which an output signal is produced that assumes a first discrete level when the magnitude of the signal passed by said low-pass filter means is greater than the magnitude of said reference signal and that assumes a second discrete level when the magnitude of the signal passed by said low-pass filter means is less than the magnitude of said reference signal, the signal passed by said low-pass filter means varying between magnitudes that are greater than and lesser than that of said reference signal as said modulated ac signal changes between said predetermined frequency and said another frequency.

11. The demodulator circuit of claim 10, wherein said modulated ac signal is an FSK signal.

12. The demodulator circuit of claim 1, wherein said modulated ac signal is modulated by discrete changes between a first phase and a second phase of said modulated ac signal when at said predetermined frequency and non-zero amplitude, and further comprising:
means for producing a reference signal, and comparator means for comparing the magnitude of the signal passed by low-pass filter means with the magnitude of said reference signal, said comparator means having an output at which an output signal is produced that assumes a first discrete level when the magnitude of the signal passed by said low-pass filter means is greater than the magnitude of said reference signal, and that assumes a second discrete level when the magnitude of the signal passed by said low-pass filter means is less than the magnitude of said reference signal, said switching circuit means and said low-pass filter means being responsive to said discrete changes between said first phase and second phase to cause a transitory decrease in the magnitude of the signal passed by said low-pass filter means, the magnitude of the reference signal being selected such that said transitory decrease in the magnitude of the signal passed by said low-pass filter means causes the output signal at the output of said comparator means to transitorily fall below the magnitude of the reference signal.

13. The demodulator circuit of claim 12, wherein said modulated ac signal is a PSK signal.

14. The demodulator circuit of claim 2, wherein said bandpass filter means has a phase shift that generally equals said phase angle $\theta$ between the input and output of said bandpass filter means for ac signals at said predetermined frequency.

15. The demodulator circuit of claim 14, wherein said phase angle $\theta$ is generally equal to $\pi$.

16. A method of demodulating a modulated ac signal of predetermined frequency that has been amplitude-modulated by discrete changes between first and second amplitudes, comprising the steps of:
bandpass filtering said modulated ac signal through a filter having a bandpass centered at said predetermined frequency to produce bandpass-filtered components of said modulated ac signal;
detecting variations in the amplitude envelope of said bandpass-filtered components of said modulated ac signal by applying said components to a signal input of a switching circuit and operating said switching circuit in response to said modulated ac signal prior to the bandpass filtering thereof, to selectively conduct said bandpass-filtered components to a signal output of said switching circuit at a frequency and phase relative to said modulated ac signal, that is effective to cause a rectification-like detection of said bandpass-filtered components; and low-pass filtering the detected bandpass-filtered signal components of said modulated ac signal as they appear at said signal output of said switching circuit to pass a signal that varies in accordance with said discrete changes between said first and second amplitudes of said modulated ac signal.

17. A method of demodulating a modulated ac signal that has been frequency modulated by discrete changes between a first predetermined frequency and a second frequency, comprising the steps of:

bandpass filtering said modulated ac signal through a filter having a bandpass centered at said first predetermined frequency to produce bandpass-filtered components of said modulated ac signal;

detecting variations in the amplitude envelope of said bandpass-filtered components of said modulated ac signal due to said discrete changes between said first and second frequencies by applying said components to a signal input of a switching circuit and operating said switching circuit in response to said modulated ac signal prior to the bandpass filtering thereof to selectively conduct said bandpass-filtered components to a signal output of said switching circuit at a frequency and phase relative to said modulated ac signal, that is effective to cause a rectification-like detection of said bandpass-filtered components; and low-pass filtering the detected bandpass-filtered signal components of said modulated ac signal as they appear at said signal output of said switching circuit to pass a signal that varies in accordance with said discrete changes between said first predetermined frequency and said second frequency of said modulated ac signal.

18. A method of demodulating a modulated ac signal of predetermined frequency that has been phase-modulated by discrete changes between first and second relative phases of said predetermined frequency, comprising the steps of:

bandpass filtering said modulated ac signal through a filter having a bandpass centered at said predetermined frequency to produce bandpass-filtered components of said modulated ac signal;

detecting variations in the amplitude envelope of said bandpass-filtered components of said modulated ac signal due to said discrete changes between said first and second relative phases by applying said components to a signal input of a switching circuit and operating said switching circuit in response to said modulated ac signal prior to the bandpass filtering thereof, to selectively conduct said bandpass-filtered components to a signal output of said switching circuit at a frequency and phase relative to said modulated ac signal that is effective to cause a rectification-like detection of said bandpass-filtered components; and low-pass filtering the detected bandpass-filtered signal components of said modulated ac signal as they appear at said signal output of said switching circuit to pass a signal that varies in accordance with said discrete changes between said first and second relative phases of said modulated ac signal.

* * * * *